Patented Oct. 10, 1950

2,525,310

UNITED STATES PATENT OFFICE 2,525,310

METHOD OF PRODUCING PAPER BASE PLASTIC SHEET MATERIAL

Izador J. Novak, Trumbull, Conn., assignor to Raybestos-Manhattan, Inc., Passaic, N. J., a corporation of New Jersey No Drawing. Application November 30, 1944, Serial No. 566,023

6 Claims. (Cl. 154—138)

This invention relates to the production of fibre base plastics and laminates thereof.

More specifically the present invention relates to a new and improved method for the production of thermosetting resin impregnated cellulose fibre web sheet material, the novel characteristics thereof, the improvements in the production of heat molded and laminated structural products therefrom, and the properties of the resulting products.

It is an object of the present invention to impregnate paper or fibrous web sheet material with a thermosetting resin in a manner whereby the resin is uniformly distributed within the sheet, without concentration of the resin at the surfaces, and to bring about what appears to be actual impregnation of the component fibres, surface or complete, so as to ultimately permit the formation of improved laminates wherein a tight bond is effected between the resin and fibre.

A further object of the present invention is to control the drying of the impregnated sheet material and the advancement of the incorporated resin whereby a soft plastic sheet having internal adhesion is produced and to thereby permit the sheet material, or a plurality of plies thereof, to be applied to shaped forms for subsequent molding or lamination and setting under heat and pressure, as distinguished from conventional paper base plastics which are not safe to distort.

A further object relates to the impregnation and controlled drying of the impregnated sheet material whereby to provide a paper base plastic material capable of being molded and laminated under heat and low pressure as distinguished from the relatively high pressures formerly required in the formation of related products.

A further object relates to the controlled drying of the impregnated sheet material in a manner whereby the resin content of the plastic paper is in the condition of a readily fusible viscous plastic and the sheet has a controlled moisture content so as to enable lamination thereof under heat and pressure to cause a plasticizing and fusing of the resin with the cellulose fibre and to form a more homogeneous mass capable of flow and densification, and upon cure to provide a product of high strength and density and freedom from tendency to delamination.

In general the process of the present invention comprises impregnating a web of cellulose fiber with an aqueous solution of a water soluble thermosetting resin to provide therein a resin content of from about 30 to 60% by weight, drying the impregnated sheet material to a temperature of approximately 190° F., to 212° F., and a moisture content of about 4% to 8% by weight, and recovering the resultant plastic paper with the resin therein in a condition of a readily fusible viscous plastic. This plastic paper may be subsequently molded or a plurality of plies thereof laminated under a low pressure and heat to fully cure the resin and to provide a product characterized by high tensile strength, good density, homogeneity and freedom from tendency to delamination.

In carrying out the present invention I may employ sheets composed of relatively low grade pulps such as a sulfite or soda pulp in thickness of about .01 to about .04 inch. It will be readily understood that dry sheets of such thickness are difficult to impregnate by prior practices such as the employment of alcoholic solutions of resin and that such previous usage required an excessive amount of resin solution, resulting largely in surface coating rather than deposition within the sheet or the fibres thereof, with attendant poor physical properties, tendency to delamination, and lack of homogeneity. I may, of course, in the alternative employ thinner, more porous paper composed of higher grade pulp with relatively enhanced results over the prior process of impregnation.

These fibrous, cellulosic webs are impregnated in accordance with the present invention with an aqueous solution of a thermosetting resin so as to incorporate within the web from about 30 to about 60% by weight, and preferably from about 35 to about 50% by weight of residual resin solids. The cellulosic webs may be impregnated while in a newly formed, incompletely dried condition, and while the fibres are still hydrated or swollen in accordance with the teachings of the Novak patent, No. 1,966,458 and other related patents, that is, while the web is supported but in a newly formed self-sustaining condition and prior to any drying treatment thereof, or in the alternative by means of a conventional size press interposed between the paper dryers, but likewise before the web has become completely dried. As a further but not fully equivalent alternative I may impregnate cellulosic fiber or paper webs in fully dried condition, by adding a period of aging in contact with the saturant before drying.

The impregnation of the paper web is carried out by means of an aqueous solution of water soluble, thermosetting resins such as the ureas, for example, urea formaldehyde, the melamines such as melamine formaldehyde, or the phenolics. The latter are composed of an aqueous alkaline solution of a water soluble resin of phenolaldehyde type such as is formed by arresting the condensation reaction of phenol and formaldehyde in the presence of an excess of caustic soda at a point where the products are still fluid and water soluble.

Impregnation of the webs with such aqueous solutions of thermosetting resins not only thoroughly and uniformly impregnates the web per se, and without surface coating, but, I believe, brings about actual impregnation, surface or complete, of the cellulosic fibres, and that is, the fibre walls as a result of water swelling allow the adsorption or absorption of the resin from the water solution. This ultimately permits the formation of improved laminates by effecting a tighter bond between resin and fiber by actual plasticizing and fusing of the resin with the water swollen cellulose to form a more homogeneous mass capable of greater flow and densification.

After the web has been impregnated it may be dried by conventional drying means in a controlled manner and to a temperature of approximately 190° F., to 212° F., and to a moisture content of about 4% to 8% by weight. This drying is preferably carried out in a gradual manner so as to bring the temperature up from substantially atmospheric to about 212° F., and after the moisture content has been reduced as indicated, the heating is terminated. This drying is preferably carried out by means of conventional paper drying drums or rolls whereby the paper passes alternately over the rolls so that it is alternately dried on opposed surfaces, these drums being internally steam heated at progressing temperatures of from about 212° F., to about 290° F. It will, however, be understood that the temperature of the paper as it progresses over these drying drums is from normal room temperature to about 212° F., and the drying is terminated before the temperature of the paper can rise higher and while it has the aforesaid moisture content. The desired moisture content of the paper is generally in inverse proportion to the resin content, that is with higher residual resin solids lower residual moisture contents will be retained and, conversely, with lower residual resin solids higher residual moisture content will be retained, within the aforesaid approximate limits.

By limiting the drying of the impregnated web to the degree and moisture content as aforesaid, the resin in the sheet while becoming partly advanced is still in the condition of a fluid or viscous plastic, and to an appreciable portion, still water soluble. For example, the thus incorporated and dried phenolic resin is advanced to the "A" stage which is of relatively greater length in residues of water soluble phenolic resins than that of the residues of alcoholic phenolic resin solutions. The residue of the water soluble phenolics have a relatively short "B" stage as compared with the relatively long "B" stage of the residues of the alcoholic phenolic resin solutions, and therefore the resulting plastic paper of the present invention may subsequently be cured rapidly by further heat treatment when desired.

The distribution of the resin in the resultant sheet is characteristically uniform and there is no surface of resin in high concentration as occurs in standard laminated papers treated with such impregnants as phenolic varnishes. As further distinguished from such prior conventional treatments which result in dry, relatively hard brittle sheets, the intermediate product of my process is soft, felty and rag-like, and may be immediately used or stored under proper conditions for future use.

Due to such properties my sheet material may be used in applications where resin treated cloth is now used, the plastic sheet having internal adhesion due to the plastic condition of the resin. Thus my sheet material may be applied to shaped forms and molded or laminated and subsequently set under heat and pressure to cure the resin, as distinguished from the prior art conventional material which was not safe to distort.

For the production of laminates either in the form of flat sheets or of curved or angular contours, a plurality of plies of the intermediate plastic product may be consolidated by means of a conventional hot press or mold. As a characterizing feature of my present invention such consolidation may be effectively carried out at low pressure such as from contact pressure of about 75 pounds per square inch to about 300 pounds per square inch, for a period of ten to twenty minutes at a temperature of about 300 to 320° F. The resultant sheets have a specific gravity of about 1.25 to about 1.35, depending upon the pressure employed and the resin content of the sheet.

The products of my process are characterized by high strength properties and a tight bond between resin and fibres. The homogeneous character of my product is evidenced by the translucency of laminates of 1/8 inch thickness having as little as 30% resin content, and a conchoidal fracture when broken or attempting splitting as evidence of uniform binder distribution, good adhesion of plies, and enhanced resistance to delamination, as distinguished from the typical jagged break of heretofore produced and laminated products.

The strong bond, uniform binder distribution, high density and strength properties of my laminated and cured products are to a large extent a result of the conditions of the intermediate or plastic paper sheet material used in forming the laminates. During the hot pressing the arrested condition of the resin or its viscous plastic nature permits cure which otherwise is very rapid with water soluble resins, to take place normally, that is, cure may be effected by heating for 10 to 20 minutes at a temperature of 300 to 320° F. The moisture content of the sheet at this time and the viscous but fluid plastic nature of the resin residue, permits it to readily fuse and flow and to bring about fusion of the resin with the cellulose fibres to effect a tight bond therebetween. This also permits greater densification to be effected by the press during the consolidation of the layers and the curing of the resin at relatively low pressures, and at the same time to form a substantially homogenous mass as evidenced by the conchoidal fracture thereof.

The ultimate product of my invention is an improved laminated thermosetting resin-bonded felted cellulose fibre structure which can be produced in the form of flat sheets or products of curved or angular contour. The laminates are relatively light weight, of good density, have a high tensile strength and modulus of elasticity, have good resistance to corrosion, moisture absorption and extremes of weather, are non-conductors of heat and electricity.

The over-all enhanced physical properties of the products render them ideal for structural purposes such as parts of aircraft, water craft, flooring, instrument boards, partitions, furniture and many other uses, wherein mechanical strength, stiffness and durability are useful and suitable, and in many instances as a substitute for metal or wood facings and the like, with the attendant advantages thereover.

I claim as my invention:

1. The method of producing paper base plastic sheet material capable of being heat molded and laminated at a low pressure which comprises uniformly impregnating a cellulose fibre web with an aqueous solution of a water soluble thermosetting resin to provide in the web a residual resin solids content of from about 30% to about 60% by weight, drying the impregnated web by gradually heating it to a temperature of approximately 190° F., to 212° F., by continuously alternating the application of heat to the opposed surfaces of the web and thereby alternating the direction of vapor flow through the thickness of the web and terminating the heat drying when the moisture content of the web has been reduced to about 4% to 8% and with the resin in the "A" stage and in the condition of a readily fusible viscous plastic.

2. The method of producing paper base plastic sheet material capable of being heat molded and laminated at a low pressure which comprises uniformly impregnating a cellulose fibre web with an aqueous solution of a water soluble phenol formaldehyde resin to provide in the web a residual resin solids content of from about 30% to about 60% by weight, drying the impregnated web by gradually heating it to a temperature of approximately 190° F., to 212° F., while continuously alternating the application of heat to the opposed surfaces of the web and terminating the heat drying when the moisture content of the web has been reduced to about 4% to 8% and with the resin in the "A" stage and in the condition of a readily fusible viscous plastic.

3. The method of producing paper base plastic sheet material capable of being heat molded and laminated at a low pressure which comprises uniformly impregnating a cellulose fibre web with an aqueous solution of a water soluble urea formaldehyde resin to provide in the web a residual resin solids content of from about 30% to about 60% by weight, drying the impregnated web by gradually heating it to a temperature of approximately 190° F., to 212° F., by continuously alternating the application of heat to the opposed surfaces of the web and thereby alternating the direction of vapor flow through the thickness of the web and terminating the heat drying when the moisture content of the web has been reduced to about 4% to 8% and with the resin in the "A" stage and in the condition of a readily fusible viscous plastic.

4. The method of producing paper base plastic sheet material capable of being heat molded and laminated at a low pressure which comprises uniformly impregnating a cellulose fibre web with an aqueous solution of a water soluble melamine formaldehyde resin to provide in the web a residual resin solids content of from about 30% to about 60% by weight, drying the impregnated web by gradually heating it to a temperature of approximately 190° F., to 212° F., by continuously alternating the application of heat to the opposed surfaces of the web and thereby alternating the direction of vapor flow through the thickness of the web and terminating the heat drying when the moisture content of the web has been reduced to about 4% to 8% and with the resin in the "A" stage and in the condition of a readily fusible viscous plastic.

5. The method of producing laminated paper base plastic material which comprises uniformly impregnating a cellulose fibre web with an aqueous solution of a water soluble thermosetting resin to provide in the web a residual resin solids content of from about 30% to about 60% by weight, drying the impregnated web by gradually heating it to a temperature of approximately 190° F. to 212° F., while continuously alternating the direction of heat application to the opposed surfaces of the web and concomitant vapor flow through the thickness of the web and terminating the heat drying when the moisture content of the web has been reduced to about 4% to 8% and with the resin in the "A" stage and in the condition of a readily fusible viscous plastic, and thereafter consolidating a plurality of plies of the resultant sheet material at a pressure of from about 75 to about 300 pounds per square inch for a period of 10 to 20 minutes and at a temperature of about 300 to 320° F. to cure the resin.

6. The method of producing paper base plastic sheet material capable of being heat molded and laminated at a low pressure which comprises uniformly impregnating a cellulose fibre web with an aqueous solution of a water soluble thermosetting resin to provide in the web a residual resin solids content of from about 35% to about 50% by weight, drying the impregnated web by gradually heating it to a temperature of approximately 190° F., to 212° F., by continuously alternating the application of heat to the opposed surfaces of the web and thereby alternating the direction of vapor flow through the thickness of the web, and terminating the heat drying when the moisture content of the web has been reduced to about 4% to 8% and with the resin in the "A" stage and in the condition of a readily fusible viscous plastic.

IZADOR J. NOVAK.

REFERENCES CITED

The following references are of record in the file of this patent:

UNITED STATES PATENTS

| Number | Name | Date |
| --- | --- | --- |
| 1,519,239 | Clay | Dec. 16, 1924 |
| 1,960,176 | Weber | May 22, 1934 |
| 2,066,857 | Rozema | Jan. 5, 1937 |
| 2,218,373 | Alexander | Oct. 15, 1940 |
| 2,318,121 | Widmer et al. | May 4, 1943 |
| 2,343,740 | Birmingham | Mar. 7, 1944 |
| 2,375,365 | Howald et al. | May 8, 1945 |

FOREIGN PATENTS

| Number | Country | Date |
| --- | --- | --- |
| 347,738 | Great Britain | Apr. 28, 1931 |
| 487,280 | Great Britain | June 17, 1938 |
| 503,580 | Great Britain | Apr. 11, 1939 |